US00RE39184E

(19) United States
(12) Reissued Patent
Schloss et al.

(10) Patent Number: US RE39,184 E
(45) Date of Reissued Patent: Jul. 11, 2006

(54) IDENTIFYING, PROCESSING AND CACHING OBJECT FRAGMENTS IN A WEB ENVIRONMENT

(75) Inventors: Robert Schloss, Briarcliff, NY (US); Philip Shi-Lung Yu, Chappaqua, NY (US)

(73) Assignee: International Busniess Machines Corporation, Armonk, NY (US)

(21) Appl. No.: 10/601,267

(22) Filed: Jun. 19, 2003

Related U.S. Patent Documents

Reissue of:
(64) Patent No.: 6,249,844
Issued: Jun. 19, 2001
Appl. No.: 09/192,010
Filed: Nov. 13, 1998

(51) Int. Cl.
*G06F 12/00* (2006.01)
*G06F 15/16* (2006.01)

(52) U.S. Cl. ..... 711/122; 711/118; 707/513; 709/203

(58) Field of Classification Search ..... 711/122, 711/118; 709/203; 707/513
See application file for complete search history.

(56) References Cited

U.S. PATENT DOCUMENTS 5,924,116 A * 7/1999 Aggarwal et al. ..... 711/122
5,946,697 A * 8/1999 Shen ..... 715/513
6,012,126 A * 1/2000 Aggarwal et al. ..... 711/133
6,026,413 A * 2/2000 Challenger et al. ..... 707/202
6,065,058 A * 5/2000 Hailpern et al. ..... 709/231
6,122,666 A * 9/2000 Beurket et al. ..... 709/226
6,128,627 A * 10/2000 Mattis et al. ..... 707/202
6,138,141 A * 10/2000 DeSimone et al. ..... 709/203
6,178,461 B1 * 1/2001 Chan et al. ..... 709/247

OTHER PUBLICATIONS

Jadau et al. "Caching of Large Database Objects in Web Server", IEEE Jun. 1007, pp 10–19.*

(Continued)

*Primary Examiner*—Krisna Lim
(74) *Attorney, Agent, or Firm*—F. Chau & Associates, LLC

(57) ABSTRACT

A method, apparatus and computer program product for identifying and creating persistent object fragments from a named object. For example, a digital content description of a named digital object can be dynamically parsed, and persistent fragment identities created and maintained to facilitate caching. Named digital objects include but are not limited to: Web pages described in XML, SGML, and HTML. The object description is revised by replacing each object fragment with its newly created persistent identity. The revised object description is then sent to the requesting node. Depending upon the properties of a fragment, this can either enable the fragment or the revised object description to be cacheable at the server and/or client device. For example, the object description can include a dynamic part which would otherwise prevent the object from being cached. The dynamic part can be recognized and treated as a separate fragment from the object description. Thus the revised document becomes static mad therefore cacheable. Furthermore, fragments can be nested. Other features determine which part/segment of a named object to recognize as a fragment identity, based on its properties including: size; processing cost; and static vs. dynamic. Yet other features can determine which fragments to cache and replace, for example based on the fragment size and processing cost. Still other features allow different versions to be generated for a fragment upon request. The version created can be determined by the property of the requesting devices (e.g., handheld device or Internet appliance) and the fragment description.

66 Claims, 13 Drawing Sheets

OTHER PUBLICATIONS

"Spyglass: Making Devices Work With The Web", Products and Services, http://www.spyglass.com/product/wp, 7 pages, printed Sep. 19, 1997.*

"Spyglass Prism Allow Non–PC Devices to Display Content Up to Four Times faster", http://www.spyglass.com/newsflash/releases/091697 prismperf.html, 3 pages, printed Sep. 19, 1997.*

Spyglass Ships Spyglass Prism 1.0 Dynamic Content Conversion Solution; Revolutionary Product Delives Existing Web Content to Non–PC Devices, http://www.spyglass-.com/newsflash/releases/091697 prismships.html, 3 pages, printed Sep. 19, 1997.*

Armando Fox et al., "Adapting to Network and Client Variability via On–Demand Dynamic Distillation", University of California at Berkeley, 11 pages, published in Proc. 7$^{th}$ Intl. conference on Architectural Support for Programming Language and Operating System, (Oct. 1996).*

Benoit Marchal from Pineapplesoft sprl, "An Introduction to SGML", http://www.pineapplesoft.com/reports/sgml/preface.html, 4 pages, (last modified Sep. 25, 1997).*

ISO 8879:1986, http://www.iso.ch/cate/d16387.html, Table of Contents, 1 page, (Last updated on May 8, 1999).*

Michael Leventhal et al., "Designing XML Internet Applications", Prentice Hall PTR, Table of Contents, 18 pages, (1998).*

Charu Aggarwal et al., "Caching on the World Wide Web", IEEE Transactions on Knowledge and Data Engineering, vol. 11, No. 1, pp. 94–107, Jan./Feb. 1999.*

* cited by examiner

< include HREF = "125.1" >
< \ include >
} $330'_1$ $330_2$ {
< m: Order >
•
•
•
< include HREF = "28.3" >
< \ include >
} $330'_3$
< /m: Order >

Fig. 4

IDENTIFYING, PROCESSING AND CACHING OBJECT FRAGMENTS IN A WEB ENVIRONMENT

Matter enclosed in heavy brackets [ ] appears in the original patent but forms no part of this reissue specification; matter printed in italics indicates the additions made by reissue.

FIELD OF THE INVENTION

The present invention relates generally to the analysis of the content of a digital document and in particular to the creation and maintenance of persistent fragment identities to facilitate caching.

BACKGROUND

With the rapid growth of the Internet, the need for efficient document exchange becomes increasingly important. In additional to the hypertext markup language (HTML), Extensible Markup Languages (XML) are becoming available that provide a meta-language for authors to design their own markup language.

On the other hand, the proliferation of various non-PC computing devices, including: handheld devices; palmtop devices; and various other Microsoft WINDOWS CE™-based devices; set-top boxes; WEB TV; smart phones; and so-called Internet appliances, (hereinafter all referred to as Internet appliances) further complicates the presentation of a Web document to a client device. In a Web document based on HTML, images are treated as separate objects pointed to by the Web document. A proxy/Web server may generate a lower resolution version or a black and white version of a color image to accommodate the limited capability of the Internet appliance. Nonetheless, these images are named persistent objects (i.e., they have separate identities which are their URLs). The proxy or Web server is merely trying to provide different versions of a named entity based on the capability of a receiving device. This is independent of any caching issues at the proxy or Web server to improve object access time.

Various work exists to provide different versions of a named object in the Web environment to support Internet appliances access to the Web. For example, PRISM from Spyglass (see e.g., http://www.spyglass.com) provides different versions of images to the Internet appliance. It can also dynamically translate richly formatted Web documents into simplified Web pages to accommodate the requirements of the receiving devices. A means for performing on-demand data type-specific lossy compression on semantically typed data and tailoring content to the specific constraints of the clients is described in "Adapting to Newark and Client Variability via On-Demand Dynamic Distiflation," by A. Fox, et al., Proc. 7th Intl. Conference on Architectural Support for Programming Languages and Operating Systems, Oct. 1996.

Using formal descriptors, such as a markup language, to describe a digital document provides tremendous flexibility. In the Internet environment, more powerful markup languages such as XML, or a subset of the Standard Generalized Markup Language (SGML) (see e.g., ISO 8879/1986; and Designing XML Internet Applications, by M. Laventhal, et al., Prentice Hall, 1998), arc being defined to augment HTML. The markup language description can provide rich information on the document structure and the final document to be generated. In fact, XML is a language that allows users to define their own language. For example, chemists can define a chemical markup language to describe a molecular structure. Mathematicians or scientists can define a math markup language to describe complex mathematical formulas. The interpretation of the markup language description and generation of the object can thus be complex. It is desirable to avoid regeneration of the same description repeatedly. Since Web pages, objects or documents on a common subject, or from the same company/division/department or authors often have parts in common, there is a need to go beyond recognizing just the repeated references to named entities (i.e., subject already has a name, e.g., URL) to subparts of named entities.

However, proxy or Web servers and client browsers today do not interpret the markup language to decompose a document or object into components, provide persistent identities and tracking mechanisms to facilitate caching and recognition of repeated occurrences of components of a named object. They mainly provide caching or processing service for named objects as a whole. For example, as mentioned previously, in HTML the text documents and images (which are separated out from the text documents by the authors) are all named objects and hence cacheable entities. Another problem is that if a document includes dynamic content caching is not meaningful as the next reference to the same document URL can result in a different version of the document. Thus a document is not cached even if only a small fraction of its content is dynamic. This is an issue for HTML documents today and is expected to become more severe for XML documents, which are more flexible and make it easier to incorporate various types of dynamic information, such as data from a database.

Thus, the need remains for a system and method for identifying and creating one or more persistent object fragments from named object, for example to facilitate caching. The present invention addresses this need.

SUMMARY

In accordance with the aforementioned needs, the present invention is directed to a method and apparatus for identifying and creating persistent object fragments from a named object. In one example, the present invention is directed to a method and apparatus for dynamically parsing a digital content description of a named digital object, creating and maintaining fragment identities to facilitate caching. Examples of named digital objects include but are not limited to: Web pages described in XML, SGML, and HTML.

The present invention has features which can parse/analyze the object description, identify object fragments and create persistent object fragment identities, and revise the object description by replacing each object fragment with its newly created persistent identity and send the revised object description to the requesting node. Depending upon the properties of a fragment, this can either enable the fragment to be cacheable (which can be at the content/proxy server and the client device in the Web environment), or make the revised object description cacheable at the server and client device. For example, consider the object description of a purchase order which contains a dynamic part to retrieve the current price of a product from the database. This dynamic part may be a small portion of the purchase order, but would prevent the object from being cached. According to one feature of the present invention for recognizing and treating the dynamic part as a separate fragment from the object description, the revised document becomes static and therefore cacheable. Furthermore, fragments can be nested.

A method is also provided to determine which part/segment of a named object to recognize as a fragment identity, based on its properties, which can include its size, processing cost to generate that segment of the object from its description, and other properties such as static vs. dynamic.

The present invention has yet other features to determine which fragments to cache and replace. The cache manager takes into account the fragment size and processing cost to generate the fragment.

The present invention has still other features which allow different versions to be generated for a fragment upon request. The version created can be determined by the property of the requesting devices and the fragment description. Different generators can be maintained for each type of descriptors or markup tags to generate different versions for different types of devices.

An example of a method for identifying object fragments in an object having features of the present invention comprises the steps of: analyzing an object description to identify one or more persistent object fragments associated with the object; creating the one or more persistent object fragments, in response to mid analyzing; and creating a persistent object fragment identity for a persistent object fragment, based on one or more of formal descriptors or an object fragment property. In one embodiment the object description is revised by replacing at least one object fragment with an associated persistent object fragment identity to enable the fragment to be cacheable at one or more of a server and a client; and the revised object description is sent to the client. The client receives the revised object description; and processes and/or caches the revised object description. The client can also receive a version of the one a more object fragments associated with the fragment identity, wherein the version is generated at the server and is based on the capability of the client (e.g., whether it is a handheld device, a set top box, or an Internet appliance.

BRIEF DESCRIPTION OF THE DRAWINGS

These, and further, objects, advantages, and features of the invention will be mere apparent from the following detailed description of a preferred embodiment and the appended drawings wherein:

FIG. 4 depicts an example of a modified document;

DETAILED DESCRIPTION

Figure 1:
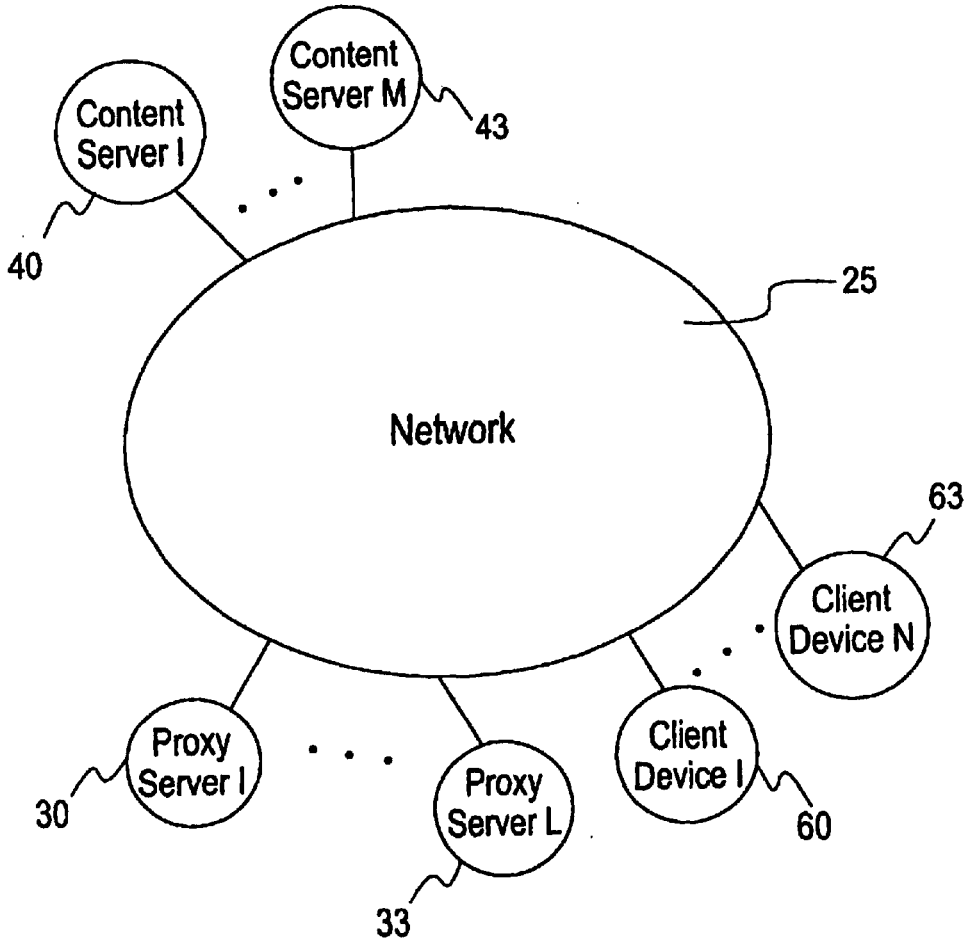
FIG. 1 is a diagram of an Internet environment having features of the present invention.

FIG. 1 depicts an example of an Internet environment adaptable to the present invention. As depicted, a client (60 . . . 63 ) may be connected through a network (25) to access proxy servers (30 . . . 33) or Web content servers (40 . . . 43). The proxy servers and Web servers can provide caching of frequently access Web objects to improve client access time. The client may also have its own cache. Those skilled in the art will realize that a proxy server can be replaced by a hierarchy of proxy servers. A client node (60) can also run a proxy server.

Figure 2:
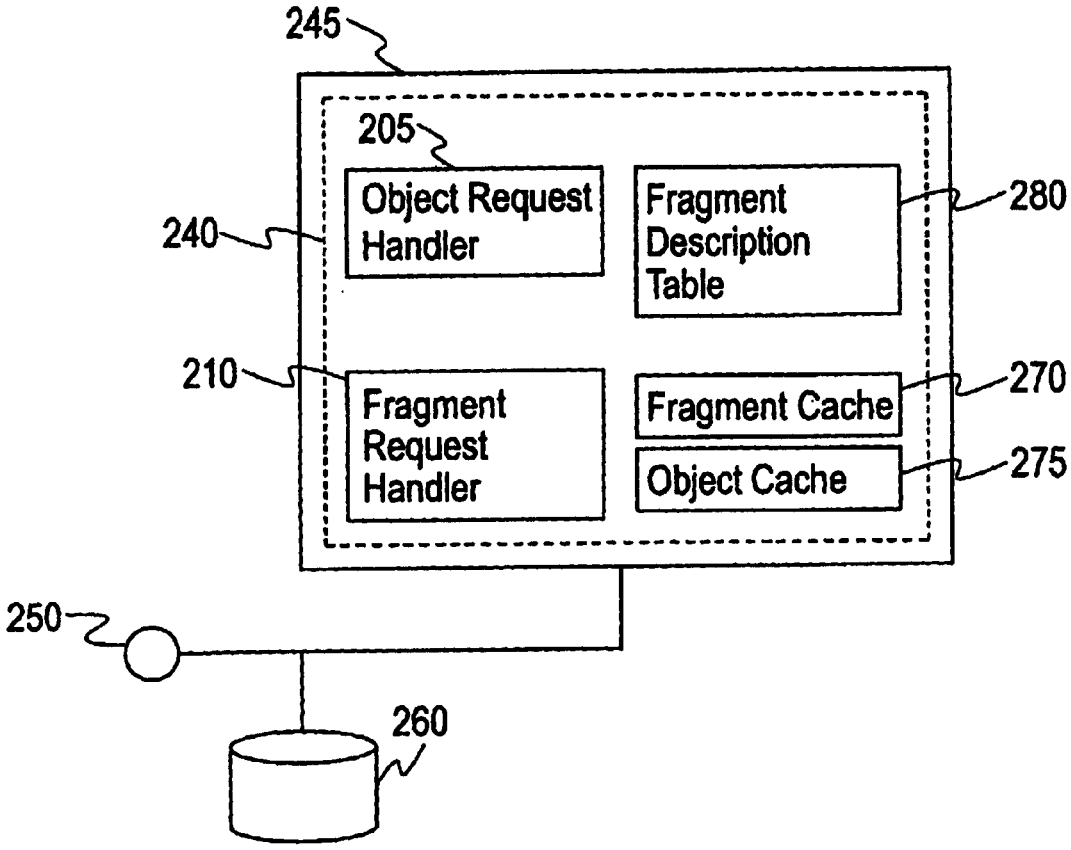
FIG. 2 is a more detailed example of a network environment having features of the present invention.

FIG. 2 depicts an example of an overall architecture of a computing node having features of the present invention. In the example of an Internet or intranet environment, the node can be a Web server, a proxy server. As depicted, the computing node can include: a CPU (250); a scratch pad or main memory (245) such as RAM; and persistent storage devices (260) such as direct access storage devices (DASD). The memory (245) stores the server logic 240 (with details depicted in FIG. 6) preferably embodied as computer executable code which may be loaded from DASD (260) into memory (245) for execution by CPU (250). The server logic (240) includes an object request handler (205) (with details depicted in FIG. 7), and a fragment request handler (210) (with details depicted in FIG. 11). It also maintains a fragment cache (270), an object cache (275) and a fragment description table (280) (with detailed depicted in FIG. 5). This information can either reside in persistent storage (260) or in main memory (245).

Figure 3:
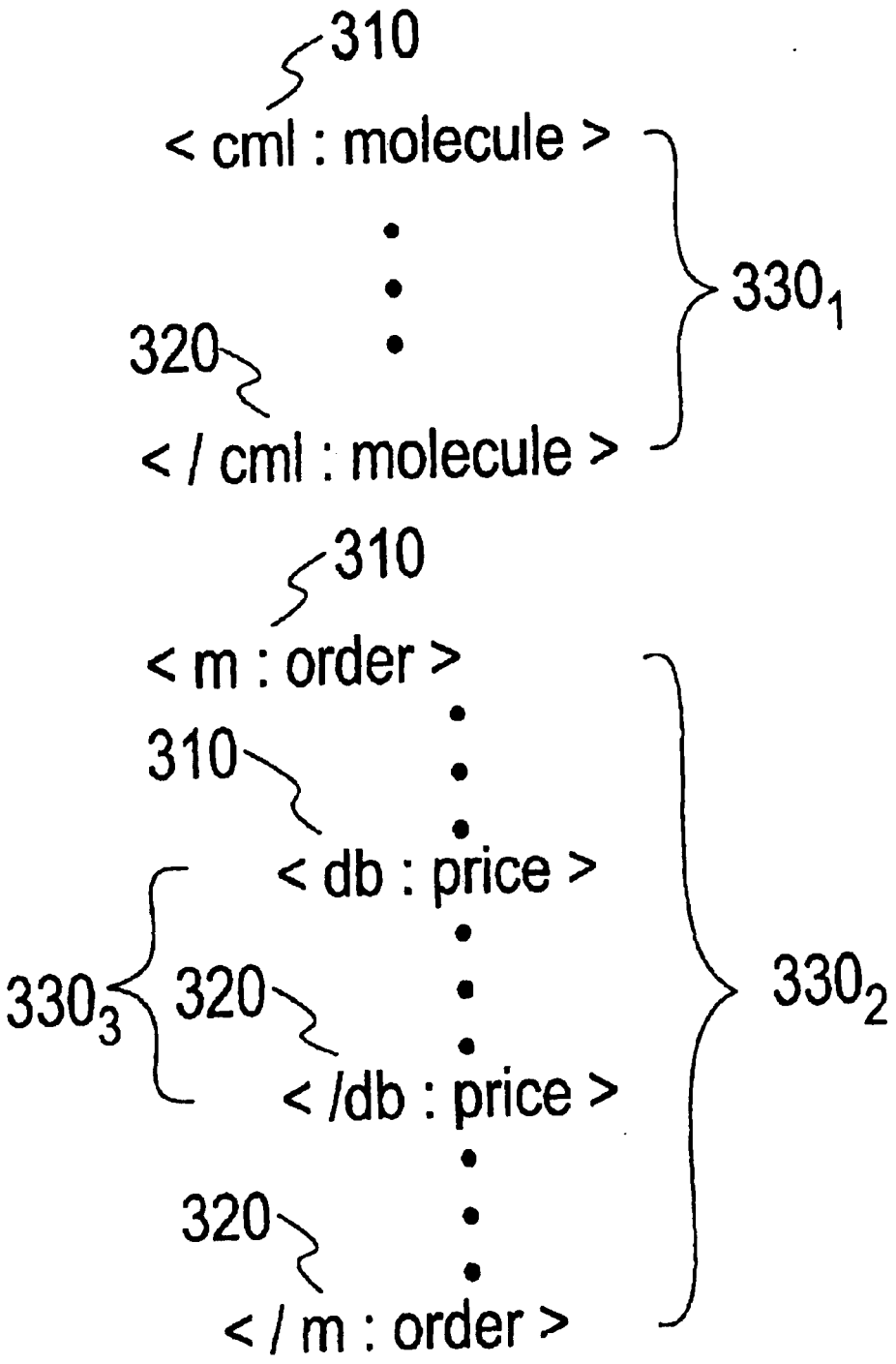
FIG. 3 depicts an example of a digital document using a markup language.

In a preferred embodiment, an XML-like document will be used as an example of a document described using some formal language, such as a markup language. FIG. 3 shows an example of an XML-like document. The key point here is that the document includes multiple segments (330), where each segment (330) is enclosed between a "start-tag" (310) and an "end-tag" (320). For example, "<cml: molecule>"(similarly, "<m: order>" and "<db: price>") is a start-tag (310) and its corresponding "end-tag" (320) is "</cml: molecule>" ("</m: order>" and "<db: price>", respectively). As depicted, the segments may be nested. For example, the segment with the <price> start-tag is included within the segment with the <m: order> start-tag. Thus parsing the document to recognize the segments can be done by matching each "end-tag" with the corresponding "start-tag", which is the first preceding "start-tag" of the same type at the same nested level. In markup languages such a XML, each segment can have a DTD (document type definition) to describe the semantics of the markup. It is an object of the present invention to select a subset of the segments contained in a document and recognize them as persistent object fragments. Fragment creation eligibility criterion will be introduced next to determine when an object fragment should be created. In the preferred embodiment, two sets of creation eligibility criterion are considered. For each persistent object fragment, a persistent identity or name is assigned and tracked so that if the object fragment appears in multiple objects or multiple times in the same object, it will be recognized as the same fragment.

The first fragment creation eligibility criterion is to recognize and separate out a segment as an object fragment so as to make the remaining document cacheable at the server or client device and/or processable/interpretable at the client device. An example is to recognize a dynamic segment as an object fragment. Consider another example where a segment can not be rendered from the markup language description by a simple client device such as WINDOWS CET™-based Internet appliances. By recognizing the segment as a separate object fragment, the client can process and/or cache the remaining document and let the proxy server interpret the markup language describing the fragment and generate an appropriate version for the client. This limitation on the client devices can be either due to limitation on the processing power or storage capacity of the client device to interpret the markup language and generate the object fragment, the limitation on the bandwidth available to the client device to retrieve the DTD of the fragment or other limitations.

The second criterion is based on the tradeoffs of processing and storage or bandwidth requirements to recognize and separate out a segment as an object fragment so it can be cached separately and reused to avoid going through interpreting the markup language description of the object to generate it again. This will improve response time and reduce server load on fragment re-references. Each fragment—once separated out—may need to be requested separately with additional requests from the client. Thus, preferably, only a segment or group of segments that meet a certain threshold on the processing requirements of interpreting the markup language description to generate the object segment is recognized as a fragment. Another consideration is the additional storage requirement to store the rendered segment. For example, consider two cases. In a first case, the processing time is 100 second of CPU time to generate the segment from the description, and the size of the rendered segment is 10K bytes. In a second case, the processing time is 1 second of CPU time to generate the segment from the description, and the size of the rendered segment is 1000 K bytes. In case 1, the savings on CPU time is substantial while the additional storage cost is minimal. The opposite is true for the second case. In other words, only in the first case is it worthwhile to recognize the segment as a separate fragment for caching. In the preferred embodiment, for an object O, let P(O) be its processing cost to generate a segment from its description and S(O) be the additional storage requirement to store the segment. A value function, F(P(O), S(O)), based on processing costs and storage requirements is used to determine the value of recognizing a fragment. An example of a value function (F) will be processing cost (in seconds) divided by the square root of the additional storage requirement (in 100 Kbytes increments). When the value function exceeds a given threshold (say 5), the segment will be recognized as a fragment.

FIG. 3 depicts an example of a document with 3 segments. As discussed, the first segment (330$_1$) begins with a start-tag, <cml: molecule>, and ends with an end-tag, </cml: molecule> and the second segment begins with a start-tag, <m: order>, and ends with an end-tag, </m: order>. The second segment (330$_2$) includes a third segment (330$_3$) nested within it. The third segment begins with a start-tag, <db: price>, and finishes with an end-tag, <db: price>. Assume the semantics of the three segments as follows. Assume the first segment provides an image of a molecule structure of a chemical compound. Assume also the second segment contains a formula to generate an order table showing the price at different quantities. Assume further, the third segment retrieves the price information from the product database. Hence it is a segment with dynamic information.

FIG. 4 depicts an example of a modified Web document after the persistent fragments have been recognized and extracted. Here it is assumed that generating the molecular structure of the chemical compound in the first segment (330$_1$) is quite complex, whereas the computation of the order table is straightforward. Hence, only the first (330$_1$') and the third segments (330$_3$') as recognized as persistent fragments with the identities, "125.1" and "28.3", respectively. In the preferred embodiment, each of the persistent fragments is replaced with an "include" statement referring to the name of the fragment, e.g. <include HREF="125.1">, indicating the reference to the fragment "125.1" and followed by a <include> statement.

Figure 5:
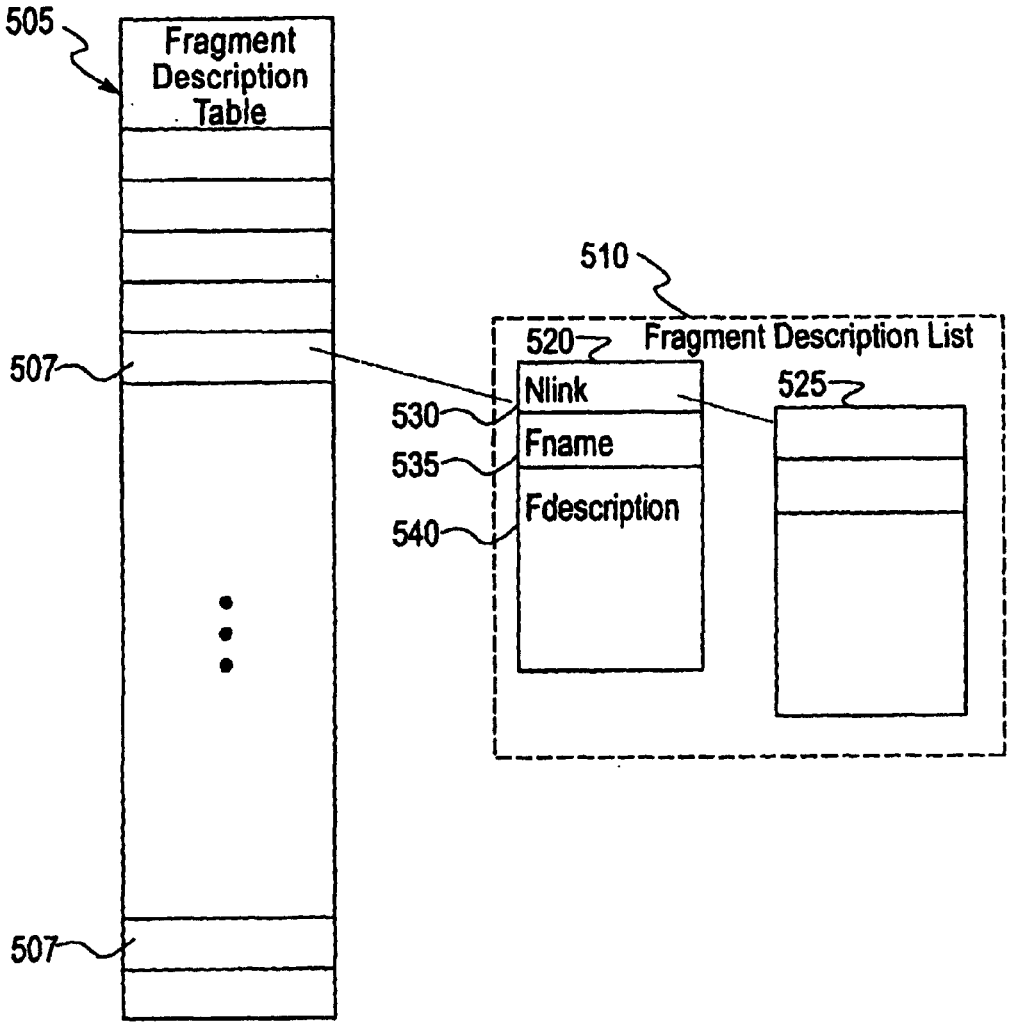
FIG. 5 depicts the data structure of the fragment description table.

FIG. 5 depicts an example of a fragment description table for tracking the object fragment identity and its description. As depicted the table (505) includes a plurality of entries (507), where each table entry (507) points to a fragment description list (510) (only one shown for ease of description). The list (510) includes one or more description elements (520 and 525). Each fragment that maps to a given entry in the fragment description table (510) has a unique description element (520) on the fragment description list (510) of the entry. The description element includes several fields: Nlink (530); Fname (535); and Fdescription (540). The Fname (535) is the persistent name of the fragment. This name is given by the persistent name creator routine (with details depicted in FIG. 10). The Fdescription (540) is the fragment description. The Nlink (530) points to the next description element (525) which maps to the same fragment description table entry (507).

Figure 6:
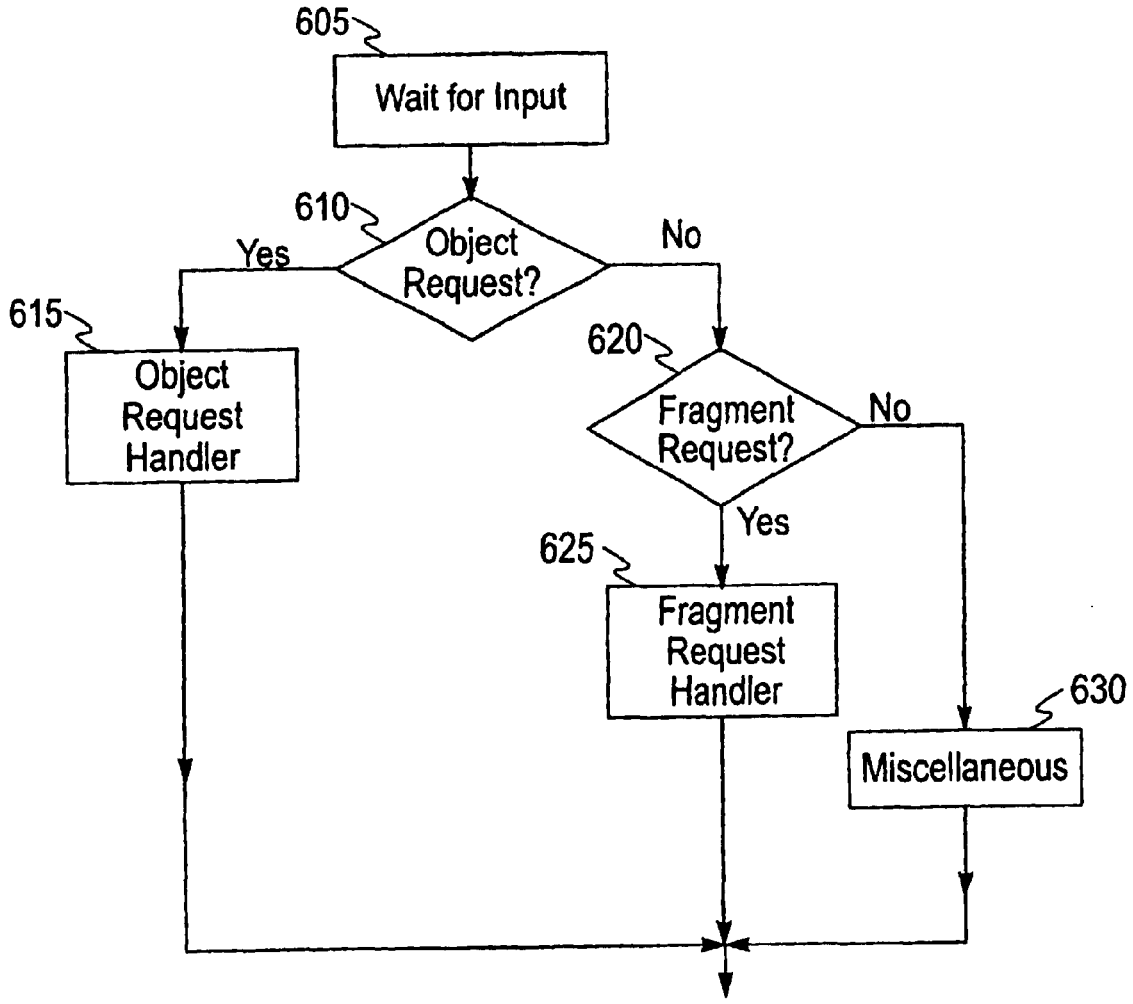
FIG. 6 is an example of the server logic of FIG. 2.

FIG. 6 depicts an example of the server logic (240). In step 605, the server waits for input. Depending upon the type of input, the appropriate routine will be invoked. If at step 610, the input is an object request, the object request handler is invoked, in step 615 (with details described with reference to FIG. 7). Otherwise, in step 620 it is checked if the input is a fragment request. For example, in a Web environment, an object request can be identified on the basis that an object name will have as the server part of its URL, the name of a proxy server. If yes, in step 625 the fragment request handler (with details described with reference to FIG. 11) is invoked. Otherwise, in step 630 a miscellaneous routing is invoked to handle other types of input such as FTP requests which are orthogonal to the current invention and thus will not be described further.

Figure 7:
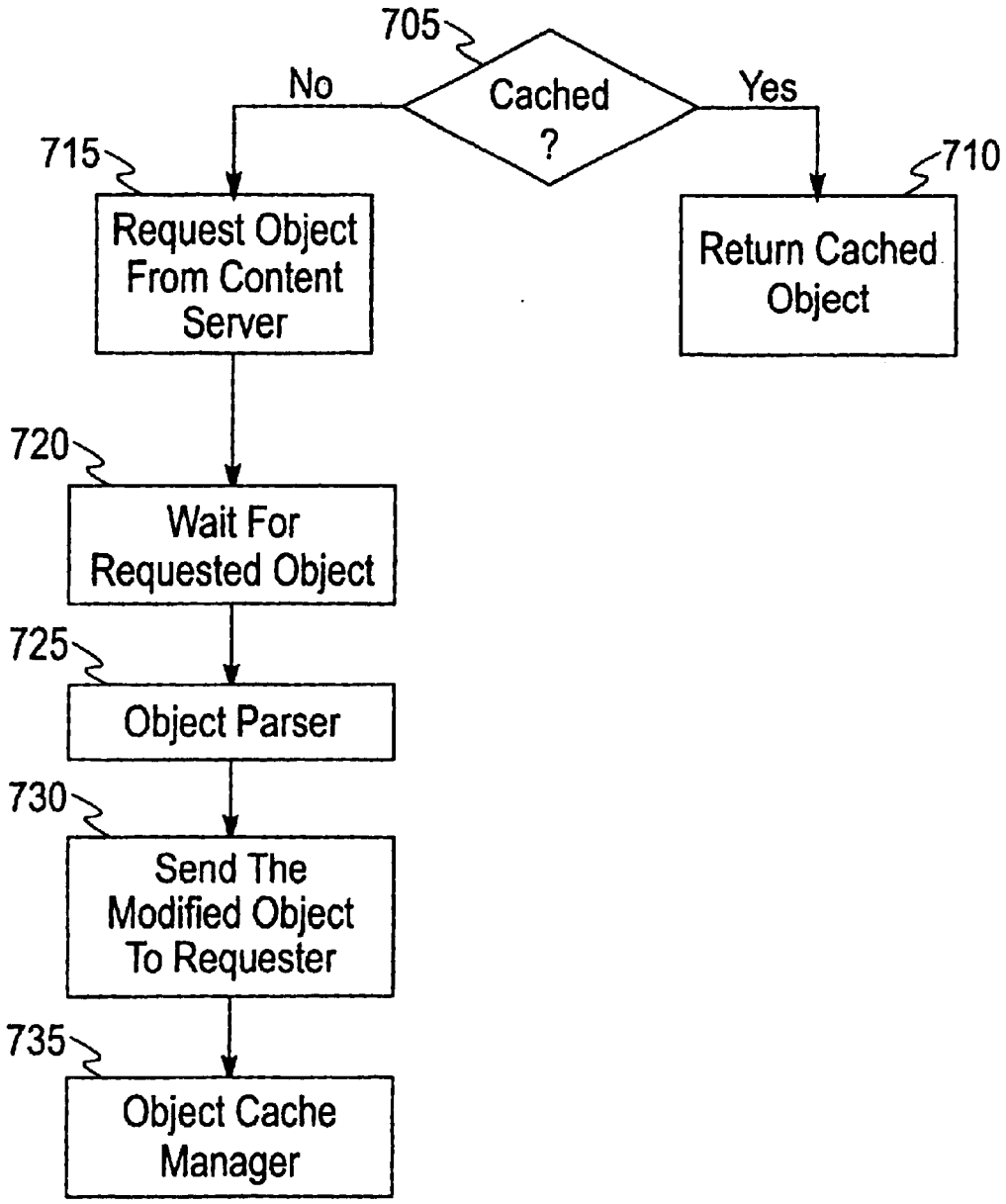
FIG. 7 is an example of the object request handler.

FIG. 7 depicts an example of the object request handler. In step 705, it is first checked whether the requested object is cached in the object cache maintained by this computing node. If the object is cached, in step 710, the cached object is returned to the requesting node. Otherwise, in step 715, the request is forwarded to the control server (or another proxy server). In step 720, the computing node waits for the object requested. In step 725, after receiving the object, the object parser (with details described with reference to FIG. 8) is invoked to analyze the object description and create fragments. In step 730, the object description, which may have been modified by the object parser, is sent back to the requestor. In step 735, the object cache manager is invoked to determine whether the object description (which may have been modified by the object parser) should be cached in the object cache. The object cache manager is similar to a conventional Web cache manager that caches the Web objects. Any standard cache management policy, such as LRU (least recently used), or its variants can take into consideration on tradeoffs between object size, update frequency, and time since last reference (i.e., the reference frequency) can be used. See for example, C. Aggarwal, et al., "On Caching Policies for Web Objects", IBM Research Report, RC 20619, Mar. 5, 1997, which is hereby incorporated by reference in its entirety, wherein variants of LRU caching algorithms on Web objects are described.

Figure 8:
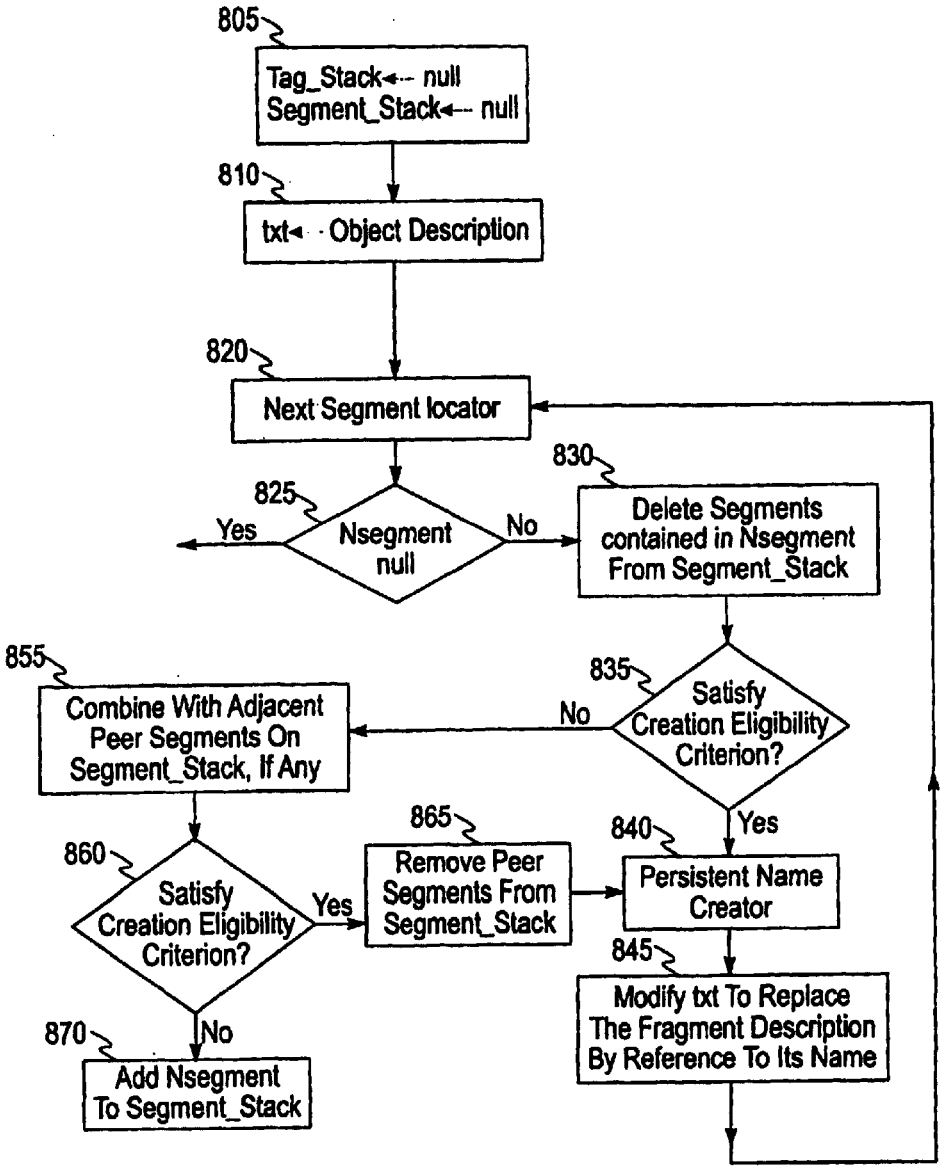
FIG. 8 is an example of the object parser.

FIG. 8 depicts an example of the object parser depicted in FIG. 7. By way of overview, the object parser maintains two stacks—a "tag_stack" and a "segment_stack"—during its processing to identify persistent fragments. The tag_stack includes the "start-tag"s scanned, but whose matching "end-tag"s have not yet been encountered during scanning of the object description. The segment_stack includes segments recognized that are not qualified as fragments, but have the potential to be combined with segments recognized subsequently to form a fragment. As depicted, in step 805, the two stacks are initialized to null. In step 810, a variable, txt, is set equal to the object description. In step 820, a next segment locator is invoked (with details described with reference to FIG. 9) to identify the next segment, Nsegment, in txt. In step 825, it is checked if Nsegment is null. If so, the processing of txt is completed. Otherwise, in step 830, it will delete segments in the segment_stack that are included in Nsegment, if any. In step 835, it is checked whether Nsegment satisfies the fragment creation eligibility criterion. If so, in step 840 a persistent name creator routine (with details depicted in FIG. 10) is invoked to create a persistent fragment identity for the segment. In step 845, the txt is modified to replace the fragment description with an <include> statement to reference the persistent fragment name followed by an <include> as described in FIG. 4. In step 855, the Nsegment is combined with its adjacent peer segments on the segment_stack, if any, where a peer segment is a segment at the same level (i.e., with the same parent) of the Nsegment in a nested markup language description. In step 860, it is checked if the combined segment satisfies the fragment creation eligibility criterion. If so, if step 865, these adjacent peer segments are removed from the segment_stack. Otherwise, in step 870, the N segment is added to segment_stack.

Figure 9:
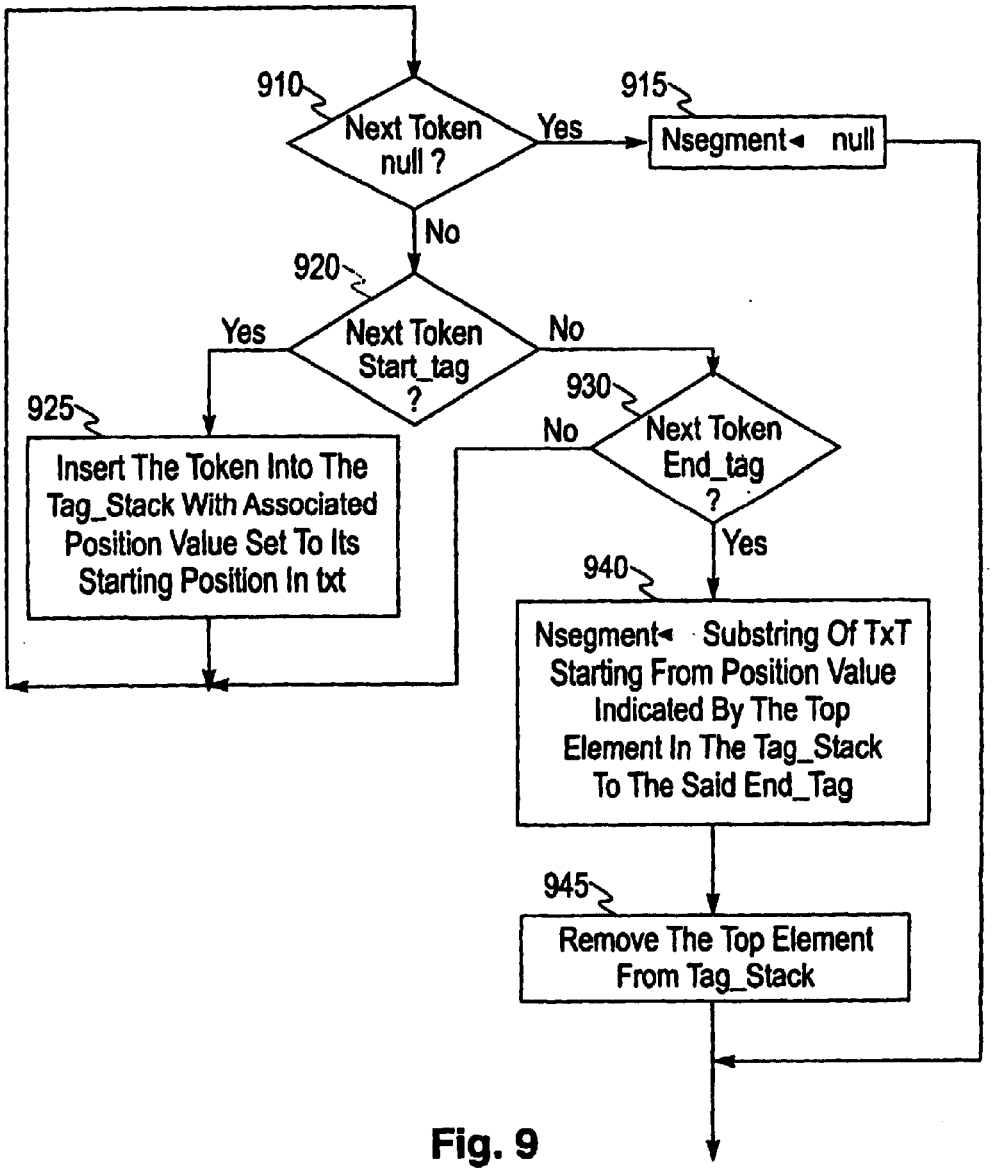
FIG. 9 is an example of the next segment locator.

FIG. 9 depicts a more detailed example of the next segment locator (FIG. 8, step 820). As depicted, in step 910, it is checked if the next token is null, where a token is a consecutive string of characters delimited between blanks (or some other delimiters defined by the markup language). If so, it step 915, the Nsegment is set to null. Otherwise, in step 920, it is checked if the next token is a "start-tag" type token. If so, the token is inserted into the tag_stack with an associated "token position value" set to its starting position in the txt variable. In step 930, it is checked if the next token is an "end-tag" type token. If so, in step 940, the Nsegment is set to the substring in txt starting from the token position value indicated by the top element of the tag_stack to the "end-tag" token. In step 945, the top element in the $tag_{13}$ stack is removed.

Figure 10:
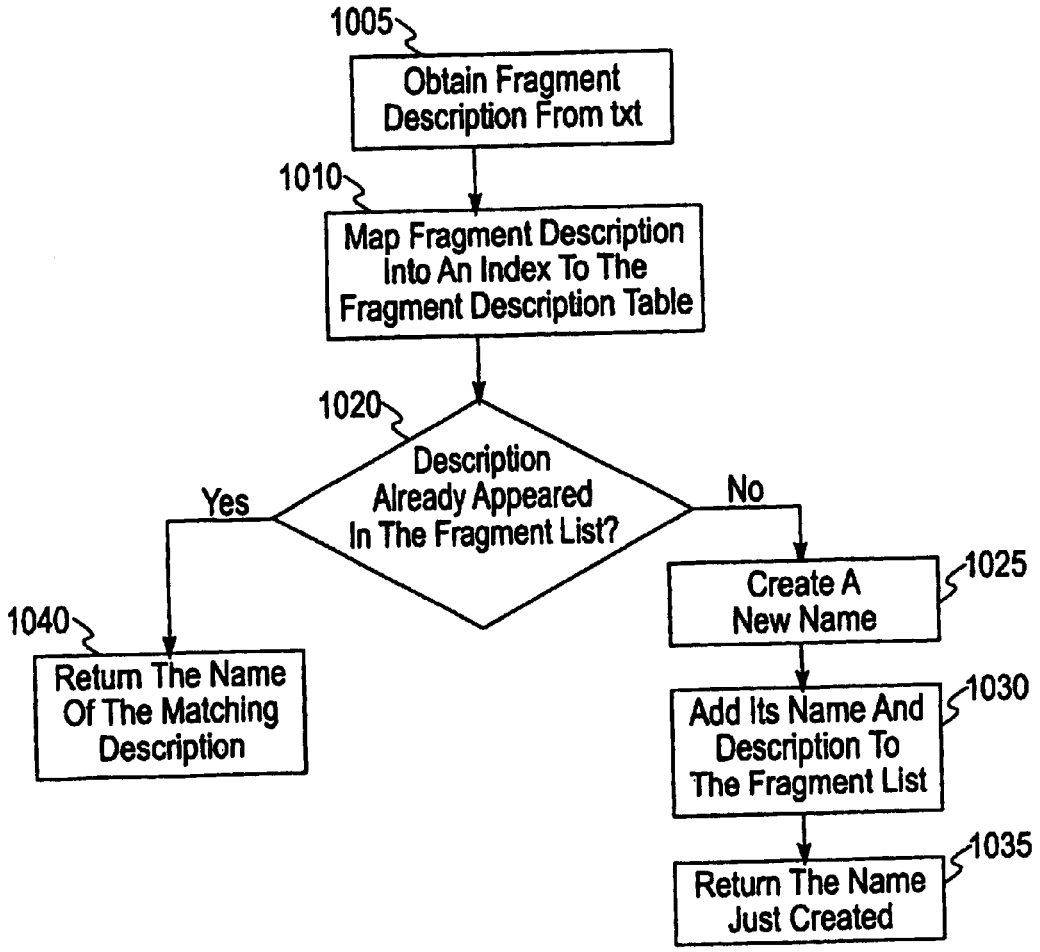
FIG. 10 is as example of the persistent name creator.

FIG. 10 depicts a more detailed example of the persistent name creator (FIG. 8, step 840). As depicted, in step 1005, the fragment description is obtained from txt. In step 1010, the fragment description is mapped into a number which corresponds to an entry of the fragment description table. Those skilled in the art will appreciate that there are many alternative mapping functions. For example, this can be done by performing an exclusive—or of all the characters in the fragment description and then treating the result as an integer to divide it by the number of entries in the fragment description table. The remainder will serve as the index to the fragment description table. In step 1020, it is checked if the segment description already appeared in the fragment description list of the said entry in the fragment description table. If so, in step 1040, the fragment name of the matching fragment description will be returned. Otherwise, in step 1025, a new persistent name is created for the fragment. There are many ways to create a unique name for the fragment. One way is to maintain a counter for each entry of the fragment description table to track the number of distinct fragment descriptions that have been mapped to this entry. The name given to the new fragment will be the value of its entry to the fragment description table augmented with the current value of the counter associated with the said entry. For example, if a fragment description is mapped to the 26th entry of the fragment description table and there already have 5 distinct fragments previously mapped to this entry, the persistent name for the new fragment will be "26.6". In step 1030, the fragment name and its description is added to the fragment description list of the corresponding entry in the fragment description table. In step 1035, the persistent name created is returned.

Figure 11:
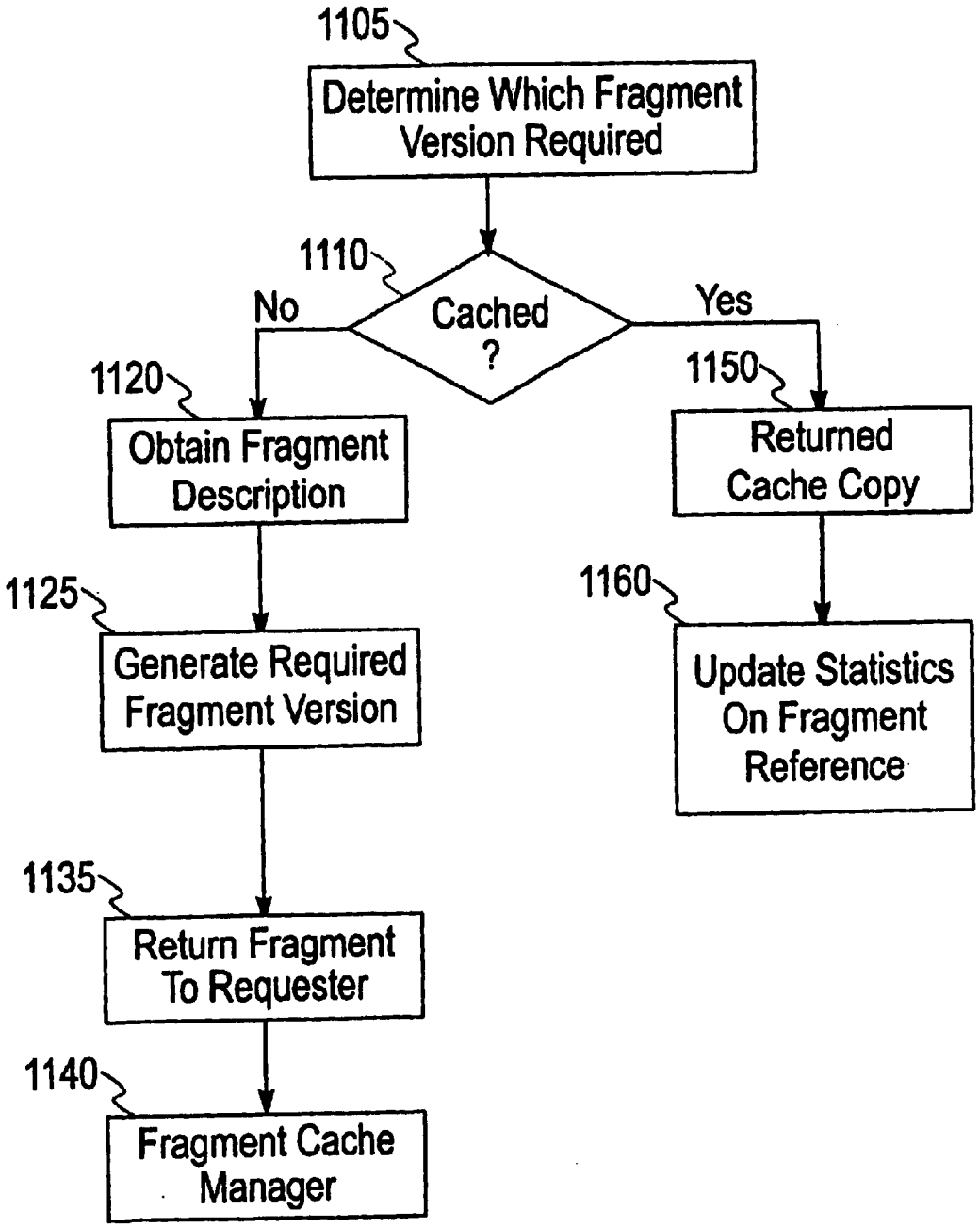
FIG. 11 is an example of the fragment request handler.

FIG. 11 depicts an example of the fragment request handler (FIG. 6, step 625). As depicted, in step 1105, it is determined which versions of the fragment needs to be generated and returned to the requesting client, if multiple versions are available. A degenerate case is that only one version is available e.g., a proxy server only has code to generate one version of a fragment. In step 1110, it is checked whether the requested version is cached in the fragment cache. If so, in step 1150, the requested version is returned to the requesting node. In step 1160, the fragment cache manager updates the reference statistics. In the preferred embodiment, an LRU cache management policy is used where the requested fragment will be moved to the top of the LRU chain. In step 1120, for the case where the fragment is not in the fragment cache, it obtains the fragment description from the fragment description table. In step 1125, the fragment is generated based on the fragment description and the client requirement. In the preferred embodiment, each type of markup language describing the fragment can have its own DTD to provide its semantic. For each type of DTD, there can be different ways of generating/rendering the fragment based on the characteristics of the requesting devices, such as processing power, storage capacity, and communication bandwidth. This can be described in a GTD (Generator Table Definition) on how to generate a different version for a given DTD to satisfy the requirement of a specific receiving device. The GTD is separate from the DTD. It can be provided by a third party such as the Internet appliance manufacturer or other software manufacturer. In step 1135, the request fragment version is returned to the requester. In step 1140, the fragment cache manager (with details described with reference to FIG. 12) is invoked.

Figure 12:
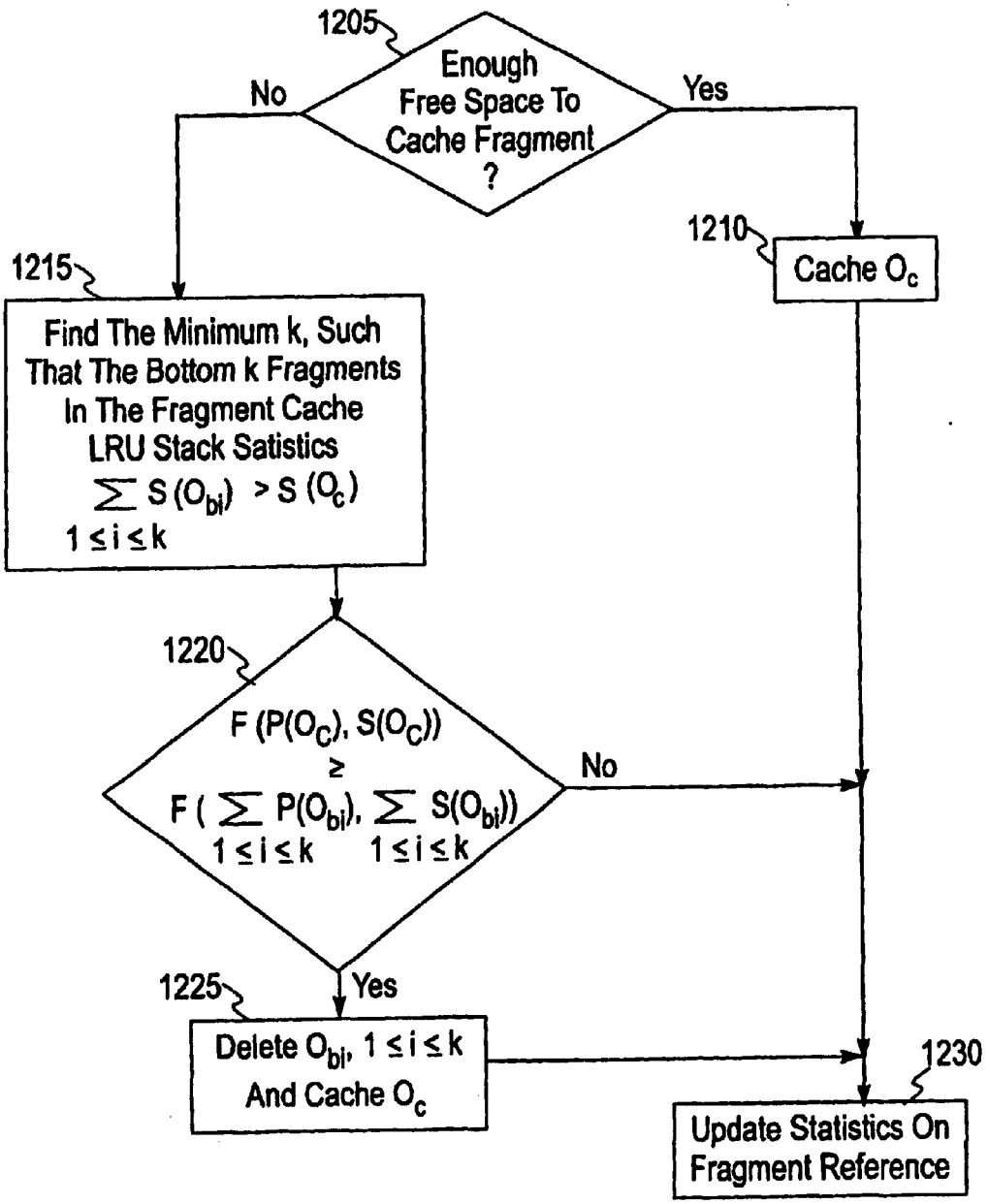
FIG. 12 is an example of the fragment cache manager.

FIG. 12 depicts an example of the fragment cache manager. In the preferred embodiment, the fragment cache manager uses an LRU type replacement policy. As depicted, in step 1205, it is checked whether there is enough free space in the fragment cache to cache the requested fragment ($O_c$). If so, fragment $O_c$ is cached in the fragment cache. Otherwise in step 1215, it determines the minimum k value such that the bottom k fragments, $O_{bk}$ in the LRU stack of the fragment cache will have a total size larger than that of fragment $O_c$, Ind step 1220, it is checked based on the value function (f) whether it is more desirable to cache $O_c$ or $\{O_{b1}, \ldots, O_{bk}\}$. The total processing cost to generate $\{O_{b1}, \ldots, O_{bk}\}$ is the sum of the processing cost of each $O_{b1}$, $1<i<k$, and the additional storage requirement to store $\{O_{b1}, \ldots, O_{bk}\}$ is the sum of the size of each $O_{b1}$, $1<i<k$. If $O_c$ is more valuable with a large F function value, in step 1225, $\{O_{b1}, \ldots, O_{bk}\}$ is deleted to make room to cache $O_c$. In step 1230, the reference statistics for the fragment version is updated for the fragment cache manager to manage its LRU cache.

To facilitate garbage collection of fragment descriptions that are no longer in use, an object-fragment table can be maintained which tracks the fragment created for each object and an fragment-object table to track all objects containing a common fragment. After an object is updated, on its next reference, the object parser may detect that the object now contains some new fragments and some fragments previously contained in the object are no longer in it. It will then check for each fragment no longer in use by the object whether there is any other object containing it based on the fragment-object table. If so, the fragment description element in FIG. 5 will be deleted from the fragment description table. Finally, the object parser will update the object-fragment table and fragment-object table accordingly. For each fragment deleted from the fragment description table, the fragment cache manager will be invoked to check if any of its fragment version is in the fragment cache and delete it.

Figure 13:
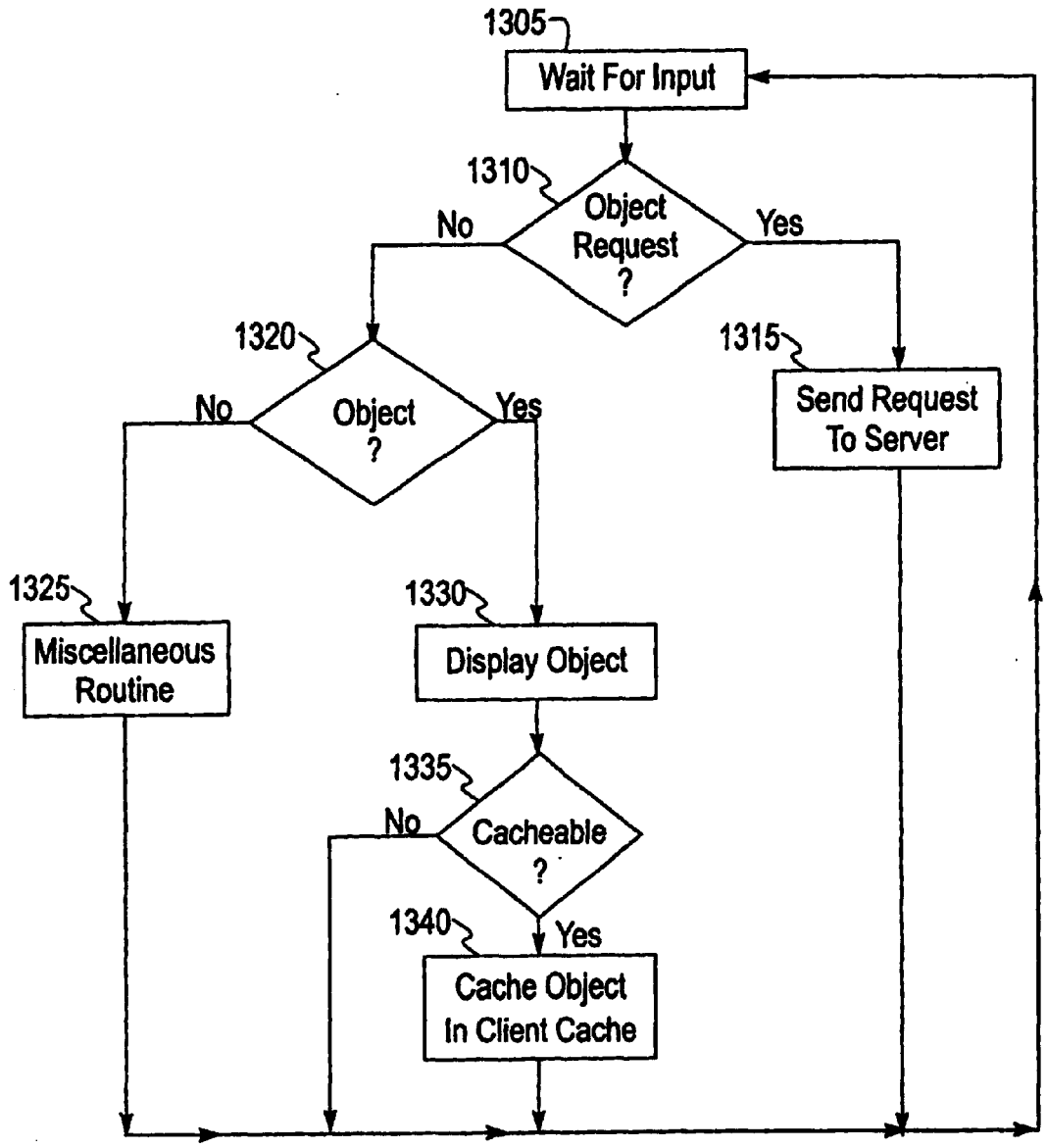
FIG. 13 depicts an example of the client logic

FIG. 13 depicts an example of the client logic. In step 1305, the client waits for input (request from a user or a response from the server). Depending upon the type of input, the appropriate routine will be invoked. If in step 1310, the input is an object request from the user, the request is sent to the server in step 1315 (see FIG. 6) where persistent object fragments in the object are identified and the object revised as necessary.

In step 1320, if the input is an object (e.g., a server response from a previous object request), the object is rendered and displayed to the user in step 1330. Recall that since persistent, object fragments have been recognized to make the revised object document cacheable at the server or client device and/or processable/interpretable at the client device. Consider the example where a segment can not be rendered from the markup language description by a simple client device such as WINDOWS CE™-based Internet appliances. According to the present invention, by recognizing the segment as a separate object fragment, the client can process and/or cache the revised document and allow the server to interpret the markup language describing the fragment and generate an appropriate version for the client. Examples of the limitations on the client device include but are not limited to the processing power or storage capacity of the client device to interpret the markup language and generate the object fragment; and/or the bandwidth available to the client device to retrieve the description of the fragment. Recall also that the recognition and revision of an object to remove segments qualifying as object fragments enable the object fragment to be cached separately and reused to avoid going through interpreting the markup language description of the object to generate it again. This will improve response time and reduce server load on fragment re-references. Each fragment—once removed—may need to be requested separately with additional requests from the client. Thus, preferably, only a segment or group of segments that meet a certain threshold on the processing requirements of interpreting the markup language description to generate the object segment were recognized as a fragment by the server.

In step 1335, the client determines whether the object is cacheable. Recall that any dynamic object or object exceeding a certain size will be deemed not cacheable at the client device, which often has limited caching capacity. According to the present invention, the server uses persistent object fragment identifiers to replace persistent object fragments (such as dynamic objects or large segments) in a Web object. The revised object is thus more cacheable at the client device, since the server has removed the dynamic or large objects from the object and reduced the size of the object. For example, recall the example of an object description for a purchase order that includes a dynamic part for retrieving the current price of a product from the database. This dynamic part may be a small portion of the purchase order, but would prevent the object from being cached. According to one feature of the present invention for recognizing and treating the dynamic part as a separate fragment from the object description, the revised document becomes static and therefore cacheable. In step 1340, if the object is cacheable, the object is cached at the local client cache. In step 1325, a miscellaneous routine is invoked to handle other types of input, such as a pager message.

A preferred embodiment of the present invention includes features implemented as software tangibly embodied on a computer program product or program storage device for execution on a processor (not shown) provided with the client (60 . . . 63) and/or server (30 . . . 33). For example, software implemented in a popular object-oriented computer executable code such as JAVA provides portability across different platforms. Those skilled in the art will appreciate that other procedure-oriented and object-oriented (OO) programming environments, including but not limited to $C^{++}$ and Smalltalk can also be employed.

Those skilled in the art will also appreciate that methods of the present invention may be implemented as software for execution on a computer or other processor-based device. The software may be embodied on a magnetic, electrical, optical, or other persistent program and/or data storage device, including but not limited to: magnetic disks, DASD, bubble memory; tape; optical disks such as CD-ROMs; and other persistent (also called nonvolatile) storage devices such as core, ROM, PROM, flash memory, or battery backed RAM. Those skilled in the art will appreciate that within the spirit and scope of the present invention, one or more of the components instantiated in the memory of the clients (60 . . . 63) or server (30 . . . 33) could be accessed and maintained directly via disk (260), the network 25, another server, or could be distributed across a plurality of servers.

Now that a preferred embodiment of the present invention has been described, with alternatives, various modifications and improvements will occur to those skill in the art. Thus, the detailed description should be understood as an example and not as a limitation. The proper scope of the invention is defined by the appended claims.

What is claimed is:

1. A method for identifying object fragments in an object, said method comprising the steps of:

analyzing an object description to identify one or more persistent object fragments associated with the object;

creating the one or more persistent object fragments, in response to said analyzing; and creating a persistent object fragment identity for a persistent object fragment, based on one or more of: formal descriptors; and an object fragment properly.

2. The method of claim 1, wherein the object description is based on the formal descriptors, said method comprising the further steps of:

maintaining and tracking the persistent object fragment identity and associated formal descriptors; and generating a cacheable object fragment.

3. The method of claim 1, comprising the further steps of revising the object description by replacing at least one object fragment with an associated persistent object fragment identity to enable one or more of: the object fragment; and a revised object description to be cacheable at one a more of: a server; and a client; and sending a revised object description to the client.

4. The method of claim 3, wherein comprising the further steps of:

the client receiving and caching the revised object description; and the client receiving a version of the one or more object fragments associated with the fragment identity, wherein the version is generated at the server and is based on the capability of the client.

5. The method of claim 1, further comprising the steps of:

receiving a request for an object fragment;

determining whether the fragment is cached, based on the object fragment identity; and if the fragment is not cached, dynamically generating the fragment.

6. The method of claim 1, further comprising the step of caching the object fragment based on one or more of: a reference frequency; a cache size; and a processing cost.

7. The method of claim 1, further comprising the step of:

generating one or more different versions of the fragment; wherein a version can be determined by one or more of: a requesting device property and the fragment description.

8. The method of claim 7, further comprising the step of: determining the version of the persistent fragment based on the requesting device property and the fragment property.

9. The method of claim 1, wherein the fragment property includes a processing requirement.

10. The method of claim 1, wherein the fragment property includes one or more of a storage requirement and a bandwidth requirement.

11. The method of claim 1, further comprising the steps of:

identifying an object fragment as a dynamic object fragment; and transforming the dynamic object to a static object by revising the object description and replacing one or more dynamic object fragments with its object identity.

12. The method of claim 1, wherein the fragment property includes whether the fragment can be generated efficiently by various client devices.

13. The method of claim 1, wherein the formal descriptors are markup tags in the object description and wherein the object is described using a markup language.

14. The method of claim 1, wherein the object is a Web page described using a markup language selected from the group consisting of XML, SGML, or HTML.

15. The method of claim 1, wherein the object fragment can be nested or hierarchical.

16. The method of claim 15, further comprising the steps of:

recognizing a nested object fragment as including a dynamic fragment or a frequently changed fragment; and making an outer fragment cacheable at one or more of a server and a client.

17. The method of claim 1, further comprising the steps of:

identifying one or more of the object fragments requiring invalidation; and garbage collecting invalid object fragments.

18. The method of claim 1, wherein the object fragment property comprises the property selected from the group consisting of: a dynamic property; a static property; how frequently the object is going to change; size; or processing cost to generate that fragment from its description.

19. The method of claim 1, further comprising the step of caching the object based on one or more object fragment properties.

20. The method of claim 1, further comprising the steps of:

selecting a subset of the segments contained in the object; and recognizing the subset as persistent object fragments.

21. The method of claim 1, wherein said step of creating a persistent object fragment further comprises the steps of:

recognizing and separating a segment as an object fragment so it can be cached separately and reused to avoid going through interpreting a markup language description of the object to generate it again; wherein the segment will only be recognized as the object fragment only if the segment or group of segments satisfies a threshold for interpreting the markup language description based on one or more of: a processing requirement; and a storage requirement.

22. The method of claim 1, wherein the persistent object fragment will have a consistent identity regardless of whether it appears in one or more of: multiple objects; and multiple times in the same object.

23. A method for caching objects including object fragments, said method comprising the steps of:

a client receiving from a server an object including a revised object description wherein at least one object fragment has been replaced with an associated persistent object fragment identity based on one or more of: formal descriptors; and an object fragment property, in response to a request for the object; and the client processing the revised object description.

24. The method of claim 23, further comprising the step of:

the client receiving a version of the one or more object fragments associated with the fragment identity, wherein the version is generated at the server and is based on the capability of the client.

25. The method of claim 24, wherein the version is generated at the server and is based on the capability of the client.

26. The method of claim 23, wherein the persistent object fragment will have a consistent identity regardless of whether it appears is one or more of: multiple objects; and multiple times in the same object.

27. The method of claim 23, wherein the formal descriptors are markup tags in the object description and wherein the object is described using a markup language.

28. The method of claim 23, wherein the object is a Web page described using a markup language selected from the group consisting of XML, SGML, or HTML.

29. The method of claim 23, wherein said processing step includes one or more of caching a revised object and rendering the object.

30. The method of claim 23, further comprising the step of: the client receiving from the server a version of the object fragment interpret and generated at the server, wherein the version generated is based on one or more of: the processing power of the client; the storage capacity of the client; and the bandwidth available to the client to retrieve a description of the fragment.

31. The method of claim 23, wherein the persistent object fragment identifier represents a dynamic object.

32. The method of claim 23, wherein the client is selected from a group consisting of; a handheld device; a palmtop device; a set-top box; a smart phone; or an Internet appliance.

33. A program storage device readable by a machine, tangibly embodying a program of instructions executable by the machine to perform method steps for identifying object fragments in an object, said method steps comprising:

analyzing an object description to identify one or more persistent object fragments associated with the object;

creating the one or more persistent object fragments, in response to said analyzing; and creating a persistent object fragment identity for a persistent object fragment, based on one or more of: formal descriptors; and an object fragment property.

34. The program storage device of claim 33, wherein the object description is based on the formal descriptors, said method comprising the further steps of maintaining and tracking the persistent object fragment identity and associated formal descriptors; and generating a cacheable object fragment.

35. The program storage device of claim 33, comprising the further steps of:

revising the object description by replacing at least one object fragment with an associated persistent object fragment identity to enable one or more of: the object fragment; and a revised object description to be cacheable at one or more of: a server; and a client; and sending a revised object description to the client.

36. The program storage device of claim 35, wherein comprising the further steps of:

the client receiving and caching the revised object description; and the client receiving a version of the one or more object fragments associated with the fragment identity, wherein the version is generated at the server and is based on the capability of the client.

37. The program storage device of claim 33, further comprising the steps of:

receiving a request for an object fragment;

determining whether the fragment is cached, based on the object fragment identity; and if the fragment is not cached, dynamically generating the fragment.

38. The program storage device of claim 33, further comprising the step of caching the object fragment based on one or more of: a reference frequency; a cache size; and a processing cost.

39. The program storage device of claim 33, further comprising the step of:

generating one or more different versions of the fragment; wherein a version can be determined by one or more of: a requesting device property and the fragment description.

40. The program storage device of claim 39, further comprising the step of: determining the version of the persistent fragment based on the requesting device property and the fragment property.

41. The program storage device of claim 33, wherein the fragment property includes a processing requirement.

42. The program storage device of claim 33, wherein the fragment property includes one or more of a storage requirement and a bandwidth requirement.

43. The program storage device of claim 33, further comprising the steps of:

identifying an object fragment in a dynamic object fragment; and transforming the dynamic object to a static object by revising the object description and replacing one or more dynamic object fragments with is object identity.

44. The program storage device of claim 33, wherein the fragment property includes whether the fragment can be generated efficiently by various client devices.

45. The program storage device of claim 33, wherein the formal descriptors are markup tags in the object description and wherein the object is described using a markup language.

46. The program storage device of claim 33, wherein the object is a Web page described using a markup language selected from the group consisting of XML, SGML, or HTML.

47. The program storage device of claim 33, wherein the object fragment can be nested or hierarchical.

48. The program storage device of claim 15, further comprising the steps of:

recognizing a nested object fragment as including a dynamic fragment or a frequently changed fragment; and making an outer fragment cacheable at one or more of a server and a client.

49. The program storage device of claim 33, further comprising the steps of:

identifying one or more of the object fragments requiring invalidation; and garbage collecting invalid object fragments.

50. The program storage device of claim 33, wherein the object fragment property comprises the property selected from the group consisting of: a dynamic property; a static property; how frequently the object is going to change; size; or processing cost to generate that fragment from its description.

51. The program storage device of claim 33, further comprising the step of caching the object based on one or more object fragment properties.

52. The program storage device of claim 33, further comprising the steps of:

selecting a subset of the segments contained in the object; and recognizing the subset as persistent object fragments.

53. The program storage device of claim 33, wherein said step of creating a persistent object fragment further comprises the steps of:

recognizing and separating a segment as an object fragment so it can be cached separately and reused to avoid going through interpreting a markup language description of the object to generate it again; wherein the segment will only be recognized as the object fragment only if the segment or group of segments satisfies a threshold for interpreting the markup language description based on one or more of: a processing requirement; and a storage requirement.

54. The program storage device of claim 33, wherein the persistent object fragment will have a consistent identity regardless of whether it appears in one or more of: multiple objects; and multiple times in the same object.

55. A program storage device readable by a machine, tangibly embodying a program of instructions executable by the machine to perform method steps for processing objects including object fragments, said method steps comprising:

a client receiving from a server an object including a revised object description wherein at least one object fragment has been replaced with an associated persistent object fragment identity based on one or one of: formal descriptors; and an object fragment property, in response to a request from the object; and the client processing the revised object description.

56. The program storage device of claim 55, further comprising the step of:

the client receiving a version of the one or more object fragments associated with the fragment identity, wherein the version is generated at the server and is based on the capability of the client.

57. The program storage device of claim 56, wherein the version is generated at the server and is based on the capability of the client.

58. The program storage device of claim 55, wherein the persistent object fragment will have a consistent identity regardless of whether it appears in one or more of: multiple objects; and multiple times in the same object.

59. The program storage device of claim 55, wherein the formal descriptors are markup tags in the object description and wherein the object is described using a markup language.

60. The program storage device of claim 55, wherein the object is a Web page described using a markup language selected from the group consisting of XML, SGML, or HTML.

61. The program storage device of claim 55, wherein said processing step includes one or more of caching a revised object and rendering the object.

62. The program storage device of claim 55, further comprising the step of: the client receiving from the server a version of the object fragment interpret and generated at the server, wherein the version generated is based on one or more of: the processing power of the client; the storage capacity of the client; and the bandwidth available to the client to retrieve a description of the fragment.

63. The program storage device of claim 55, wherein the persistent object fragment identifier represents a dynamic object.

64. The program storage device of claim 55, wherein the client is selected from a group consisting of: a handheld device; a palmtop device; a set-top box; a smart phone; or an Internet appliance.

*65. A method for caching objects including object fragments, and method comprising the steps of:*

*a client receiving from a server an object including an object description wherein at least one object fragment is referenced by an associated persistent object fragment identity based on one or more of: formal descriptors; and an object fragment property, in response to a request for the object; and*

*the client processing the object description including the associated persistent object fragment identity.*

*66. A program storage device readable by a machine, tangibly embodying a program of instructions executable by the machine to perform method steps for processing objects including object fragments, said method steps comprising:*

*a client receiving from a server an object including an object description wherein at least one object fragment is referenced by an associated persistent object fragment identity based on one or more of: formal descriptors; and the client processing the object description including the associated persistent object fragment identity.*

* * * * *